US011628547B2

(12) United States Patent
Balleste Izuzquiza et al.

(10) Patent No.: US 11,628,547 B2
(45) Date of Patent: Apr. 18, 2023

(54) REMOVAL TOOL FOR A FILTER INSERT OF A LIQUID FILTER

(71) Applicant: Robert Bosch GmbH, Stuttgart (DE)

(72) Inventors: Elena Balleste Izuzquiza, Madrid (DE); Jose Luis Arias Arias, Madrid (ES)

(73) Assignee: ROBERT BOSCH GMBH, Stuttgart (DE)

( * ) Notice: Subject to any disclaimer, the term of this patent is extended or adjusted under 35 U.S.C. 154(b) by 680 days.

(21) Appl. No.: 16/496,088

(22) PCT Filed: Feb. 2, 2018

(86) PCT No.: PCT/EP2018/052653
§ 371 (c)(1),
(2) Date: Nov. 21, 2019

(87) PCT Pub. No.: WO2018/177630
PCT Pub. Date: Oct. 4, 2018

(65) Prior Publication Data
US 2020/0384621 A1    Dec. 10, 2020

(30) Foreign Application Priority Data

Mar. 28, 2017  (DE) .......................... 102017205237.6

(51) Int. Cl.
*B25B 27/02* (2006.01)
*B01D 29/96* (2006.01)
*B25B 27/00* (2006.01)

(52) U.S. Cl.
CPC .............. *B25B 27/02* (2013.01); *B01D 29/96* (2013.01); *B01D 2201/24* (2013.01); *B25B 27/0042* (2013.01)

(58) Field of Classification Search
CPC ..... B25B 27/02; B25B 27/0042; B25B 27/06; B25B 27/0035; B01D 29/96; B01D 2201/24
(Continued)

(56) References Cited

U.S. PATENT DOCUMENTS

| 4,507,837 A | 4/1985 | Hinkle |
| 5,082,561 A | 1/1992 | LaPierre |

(Continued)

FOREIGN PATENT DOCUMENTS

| CN | 102186554 A | 9/2011 |
| CN | 103395032 A | 11/2013 |

(Continued)

OTHER PUBLICATIONS

International Search Report for PCT/EP2018/052653, dated Apr. 5, 2018.

*Primary Examiner* — Madeline Gonzalez
(74) *Attorney, Agent, or Firm* — Norton Rose Fulbright US LLP; Gerard Messina

(57) ABSTRACT

A removal tool for a filter insert of a liquid filter. The removal tool includes a body extending along a longitudinal axis. At a distal end, the body includes a first arm and a second arm, the two arms extending essentially in parallel to the longitudinal axis and being spaced apart from one another. The two arms are elastically reversibly deflectable toward one another. A retaining element is situated at the first arm. In an open state of the retaining element, the two arms may be moved toward one another. In a closed state of the retaining element, the retaining element couples the two arms to one another and blocks a movement of the two arms toward one another.

11 Claims, 9 Drawing Sheets

(58) Field of Classification Search
USPC ..... 29/426.5, 426.6; 210/232, 238, 470, 542
See application file for complete search history.

(56) References Cited

U.S. PATENT DOCUMENTS

| | | | |
|---|---|---|---|
| 5,276,951 | A | 1/1994 | Gluszek |
| 5,321,877 | A | 6/1994 | Brittain et al. |
| 9,038,254 | B1 | 5/2015 | Villines |
| 9,579,779 | B1 * | 2/2017 | Hunter .................... B25B 27/02 |
| 2015/0174746 | A1 * | 6/2015 | Tomuro ................ B25B 27/023 |
| | | | 29/240 |
| 2015/0174756 | A1 | 6/2015 | Firth et al. |

FOREIGN PATENT DOCUMENTS

| | | |
|---|---|---|
| CN | 105382757 A | 3/2016 |
| DE | 112010002898 | 6/2012 |
| DE | 112013000309 | 2/2016 |
| DE | 102015207565 | 10/2016 |
| EP | 0630309 A1 | 12/1994 |
| EP | 2789425 A2 | 10/2014 |

* cited by examiner

REMOVAL TOOL FOR A FILTER INSERT OF A LIQUID FILTER

FIELD OF THE INVENTION

The present invention relates to a removal tool for a filter insert of a liquid filter. The present invention furthermore relates to a method for removing a filter insert of a liquid filter.

BACKGROUND INFORMATION

Liquid filters are believed to be in the related art. Such liquid filters may be used in the automotive field, for example, to remove particles and water from fuel. Other liquid filters are configured to purify urea solutions used for DENOX systems or SCR systems, i.e., for nitrogen oxide reduction. Such liquid filters are usually made up of a housing, an inlet for the liquid, and an outlet for the purified liquid. An exchangeable filter insert may be provided in the housing of the liquid filter. This filter insert may be formed of a filter element, for example, which is attached between a first end cap and a second end cap. The first end cap may have a first opening, and the second end cap may have a second opening.

To achieve sufficient filtration of the liquid at all times, it may be necessary to exchange the filter insert after a certain duration or a mileage of the vehicle. For this purpose, either the entire liquid filter may be exchanged, which, however, is cost-intensive. As an alternative, it may be provided to remove only the filter insert from the housing.

For this purpose, a so-called removal tool may be provided. Such removal tools may, for example, be enclosed with the replacement filter insert to remove the filter insert in use from the housing of the liquid filter quickly, securely and without damage.

Such a removal tool may, for example, have a one-piece configuration in the form of a flat, elongated stick (similar to an ice cream bar stick) extending along a longitudinal axis. At a distal end, the removal tool may include one or two hook(s). The removal tool may be pushed through the two openings of the first and second end caps of the filter insert for the removal process. The hooks of the removal tool latchingly engage behind an edge of the downstream opening, as viewed along the inserting direction, of the downstream end cap. The expression "downstream" shall only be understood to indicate a position with respect to a direction. When tension is now exerted on the removal tool counter to the inserting direction, the filter insert may be pulled completely out of the housing of the liquid filter. The latching engagement of the removal tool behind the opening, situated the furthest with respect to the inserting direction, of the end cap of the filter insert, situated the furthest, ensures that the complete filter insert may be removed from the housing. If the removal tool were to latchingly engage only behind the front opening, as viewed with respect to the inserting direction, there is e the risk that the filter element, which may be saturated with liquid, would tear when the removal tool is pulled out and, in this way, a portion of the filter insert remain stuck in the housing.

A removal tool for a filter insert of a liquid filter is discussed in DE 10 2015 207 565 A1.

SUMMARY OF THE INVENTION

The present invention is based on the finding that either a specific geometry must be present inside the filter insert when using one-piece removal tools to ensure that an insertion of the removal tool is low-friction and damage-free. As an alternative, it is necessary to configure the removal tool in a flexible or elastic manner in such a way that it is elastically deformable during mechanical contact with an inner side of the openings of the end caps or of the filter element, and further insertion is possible. These configuration conditions make a dedicated removal tool, which is configured specifically for the filter insert, necessary for each filter insert or each diameter of the openings.

Although, moreover, the inserting process may be easily implementable until the removal tool latchingly engages at the filter insert with the configuration of a flexible or elastic removal tool—at the same time, however, this increases the risk that the stability of the removal tool is not sufficient to move the filter insert out of the housing when the filter insert is being pulled out or removed. This may be the case, for example, when the filter insert is seated particularly firmly. In such a case, it is possible that the removal tool deforms due to its elasticity and is not sufficiently stable to move the filter insert out of the housing. As a result, multiple attempts may be necessary to complete the removal of the filter insert from the housing. This also increases the risk of damaging the filter element during the re-insertion of the removal tool, whereby, in turn, the risk may increase that it is not possible to completely remove the filter insert from the housing.

In the case of a conventional removal tool, the secure insertion of the removal tool until it latchingly engages behind the opening of the end cap may also be problematic. During the manufacturing process of the filter insert, it is possible that the diameter of the opening is reduced by adhesive material or molten compound when the end cap is adhesively bonded to the filter element or the end cap is welded to the filter element. In such a case, the flexibility or elasticity of the removal tool at its distal end transverse to the inserting direction may not be sufficiently high to reliably move the removal tool through the opening in such a way that the hooks of the removal tool engage behind the edge of the opening. The risk exists that the filter insert becomes damaged or that one of the hooks of the removal tool deforms or breaks. If, on the other hand, the elasticity on the distal end is sufficiently high, the above-described slipping may occur during the pull-out process.

A need may therefore exist to provide a removal tool which is configured to be sufficiently flexible or elastic on its distal end to be fed easily and damage-free through the filter insert. At the same time, the removal tool is to have sufficient stability or stiffness on its distal end during the pull-out process so that slipping is prevented even in the case of tight filter inserts.

The removal tool is also to be elastic or flexible in such a way that, even with larger tolerances of the opening diameter as a consequence of tolerances in the production process, secure feeding through the opening of the end cap is reliably made possible without major energy expenditure and without damaging the removal tool or the filter insert, and subsequently secure latching engagement behind the edge of the opening of the end cap is made possible. Finally, the removal tool is to be easy and cost-effective to manufacture.

Advantages of the Invention

This need may be covered by the subject matter of the present invention according to the independent claims. Advantageous specific embodiments of the present invention are described in the dependent claims.

According to a first aspect of the present invention, a removal tool for a filter insert of a liquid filter is provided. The removal tool includes a body extending along a longitudinal axis. At a distal end, the body includes a first arm and a second arm. The two arms extend essentially in parallel to the longitudinal axis and are spaced apart from one another, e.g., in the shape of two fork tines. The two arms are elastically reversibly deflectable toward one another, e.g., in a direction transverse to the longitudinal axis. It is provided that a retaining element is situated on the first arm, the two arms being movable toward one another in an open state of the retaining element, the retaining element coupling the two arms to one another and blocking a movement of the two arms toward one another in a closed state of the retaining element.

The term "include" here shall be understood to be synonymous to the term "have".

In the open state of the retaining element, the retaining element may, e.g., not be coupled to the second arm.

The expression "essentially in parallel to the longitudinal axis" is understood to mean directions which may deviate up to +/−20° from the longitudinal axis.

The term "elastically reversibly" is understood to mean that the two arms of the removal tool may be deflected toward one another with an application of a force transverse to the longitudinal axis and may spring back into their original position after the application of the force has ended. A plastic deformation should not arise in the process. Such an elastically reversible movement may, for example, occur when pushing through an opening of an end cap of a filter insert, the opening having a smaller diameter than the distance between the two ends of the two arms in a direction transverse to the longitudinal axis.

In other words: a removal tool is provided which, in the open state of the retaining element, is sufficiently flexible to also be pushed through a narrow opening of an end cap of a filter element, without the two arms of the removal tool or a portion of the filter insert being damaged. To subsequently transport the removal tool, together with the filter insert, out of a housing of a liquid filter, the retaining element is displaced into the closed state. In this closed state, the retaining element couples the two arms to one another, at least when an application of a force is exerted on the two arms which moves the two arms toward one another, e.g., a force transverse to the longitudinal axis. When this force is exerted, the second arm is supported on the retaining element and cannot be moved further toward the first arm, and vice versa. In this way, a reduction in the distance between the first arm and the second arm is prevented, whereby a slipping of the removal tool is prevented when the filter insert is being pulled out of the liquid filter.

The provision of the retaining element advantageously achieves that the removal tool may have a greater elasticity or flexibility in the area of the two arms. For example, a notch between the two arms may be configured to be longer compared to conventional removal tools, whereby the shape elasticity is improved. In other examples, a more flexible material or a thinner cross section may be used to arrive at a greater flexibility. In this way, the removal tool may be fed through the filter insert more easily and reliably without damage. At the same time, in the closed state of the retaining element, the removal tool is mechanically stabilized in such a way that a slipping during the pull-out process is avoided. In this way, the requirements of inserting the removal tool without damage and easily on the one hand, and of reliably and securely pulling out the filter insert, without the removal tool slipping, on the other hand, are met simultaneously.

In one refinement, it is provided that the first arm includes a first hook, the first hook projecting from the first arm essentially transversely to the longitudinal axis. The second arm includes a second hook, the second hook projecting from the second arm essentially transversely to the longitudinal axis. For example, the two hooks may point in opposite directions in the process.

In this way, it is advantageously achieved that the removal tool may be reliably and securely coupled or mechanically connected to the filter insert after the insertion into the filter insert, and the filter insert, in this way, may be pulled out of the liquid filter or out of its housing.

In one refinement, it is provided that the body of the removal tool has a flat configuration. An overall length of the body is at least 5 times a width of the body. The width of the body is at least 3 times a thickness of the body, which may be at least 4 times the thickness, and most particularly at least 5 times the thickness. For example, the width is 3 times the thickness or 3.5 times the thickness or 4.5 times the thickness. In this way, a particularly lightweight and cost-effective removal tool may be provided. As a result of the provided shape, for example resembling the shape of an ice cream bar stick or a spatula, the removal tool thus configured is easy to handle and may be fed through the filter insert without damage.

In one refinement, it is provided that the retaining element is configured as a bracket. As an alternative, the retaining element is configured as a catch. As a further alternative, the retaining element is configured as a safety catch. The bracket or the catch or the safety catch is formed or attached or situated on the first arm. In the closed state, the retaining element may extend from the first arm toward the second arm. The retaining element may bridge the distance between the first arm and the second arm. As a result of the provided configuration, the retaining element may be configured in a particularly stable and simple manner.

In one refinement, it is provided that the retaining element is attached to the first arm with the aid of a swivel joint. In this way, it is advantageously achieved that the retaining element may be moved easily and with little energy expenditure from the open state into the closed state, and also back again from the closed state into the open state.

For example, in the open state, the retaining element initially protrudes obliquely forward beyond the body of the removal tool. The term "forward" shall be understood to mean a direction which extends outside the contour of the removal tool without the retaining element, in particular, pointing in the direction of the longitudinal axis.

For the transfer into the closed state, the retaining element may then be pivoted or rotated about the swivel joint, so that it is positioned between the first arm and the second arm. During an application of a force onto one arm or both arms transverse to the longitudinal axis, the retaining element in the manner of a safety catch or a bracket (e.g., like a door stopper) then blocks a further movement of the two arms toward one another as soon as the retaining element makes mechanical contact with the second arm.

One refinement provides that the swivel joint is configured as an integral joint or as a hinge or as a snap hinge.

An integral hinge or an integral joint shall be understood to mean strap hinges which do not include any (separate) mechanical parts. They are configured as a flexible, thin-walled joint groove between two parts to be joined. In this case, for example, between the first arm and the retaining element.

As a result of the configuration as an integral hinge or as an integral joint, the swivel joint is manufacturable particularly inexpensively and without major assembly complexity. Additionally, individual parts are spared.

A snap hinge shall be understood as a refined configuration of an integral hinge. A snap hinge has two stable end positions: an or the open state and a or the closed state.

Only by way of example, a snap hinge may be configured according to the principle of a spring-tensioned four-joint mechanism. In addition to the joint groove of an integral hinge (first pivot point), the two end positions are reached in the process with the aid of a spring element and with three joint grooves. In this way, care may be taken when configuring the snap hinge that the spring element is almost relieved in the two resting states. The configuration as a snap hinge advantageously achieves that the retaining element may be reliably displaced into the open state or into the closed state and remains there in a stable manner. This may be of advantage, e.g., since frequently only limited visibility options are present during the use of a removal tool. A snap hinge frequently also generates a small vibration or a little noise when snapping over between the open to the closed state or from the closed to the open state. In this way, an operator or a technician may haptically or acoustically establish during the insertion of the removal tool into the filter insert whether the retaining element has switched from the open state into the closed state. The further advantage is that the retaining element is prevented from being overpressed, i.e., displaced further than into the closed state.

Particularly advantageously, an integral joint or a snap hinge may be configured in one piece with the removal tool, for example in an injection molding process. In this way, such a removal tool may be manufactured with improved functionality without major cost expenditure.

In one refinement, it is provided that the retaining element is situated on the first arm in such a way that it projects forwardly from the body in the open state and encloses an angle of maximally 45° to a transverse direction. The transverse direction extends perpendicularly to the longitudinal axis.

As an alternative or in addition, it may be provided that the retaining element is situated on the first arm in such a way that it extends in the transverse direction between the two arms in the closed state.

As a result of the provided arrangement of the retaining element in the open state, it may advantageously be achieved that the retaining element, during insertion into the filter insert, is automatically transferred into the closed state without further intervention by an operator or a technician. The reason is that, when the end position has been reached, the retaining element may strike against a housing wall or a cover of the liquid filter, for example, the retaining element being automatically transferred into the closed state due to the retaining element projecting obliquely forward. Furthermore, as a result of a retaining element projecting by maximally 45° to a transverse direction in the open state, it is advantageously achieved that the retaining element, during insertion into the filter insert, does not act like a mandrel and, when striking against a filter medium or a filter element or against the end cap of the filter insert, either breaks off itself or damages the parts it struck.

By the retaining element, in the closed state, extending in the transverse direction between the two arms, a particularly stable blockage of a movement of the two arms toward one another is prevented. In this way, the removal tool becomes particularly torsion-resistant and mechanically stable in the area of the two arms in the closed state of the retaining element.

In one refinement, it is provided that, in the closed state, the retaining element together with the second arm forms a connection. The connection may be, for example, form-locked (e.g., using a bayonet catch or a retainer bracket) or force-fit or frictionally engaged.

The term "detachable connection" shall be understood in such a way that the connection is detachable without damage.

As a result of the provided detachable connection, it is advantageously achieved that it is ensured in the closed state that the retaining element is not accidentally or inadvertently displaced from the closed state back into the open state. At the same time, it is advantageously achieved that the retaining element may be transferred from the closed state back into the open state after the pull-out process has been completed, for example by overcoming the frictional force of the frictionally engaged connection or a necessary release force in the case of a force-fit connection, or, in the case of a form-locked connection, for example using a bayonet catch, that the closure is opened again.

In this way, the removal tool may be re-used, which is particularly cost-effective and environmentally friendly.

In one refinement, it is provided that a first length of the first arm from a first root of the first arm on the body up to a first free end of the first arm is at least 2.5 times, which may be at least 3 times, a maximum distance between the two arms.

As an alternative or in addition, it is provided that a second length of the second arm from a second root of the second arm on the body up to a second free end of the second arm is at least 2.5 times, which may be at least 3 times, a maximum distance between the two arms.

As a result of these embodiments, it is advantageously achieved that the removal tool is particularly shape-elastic or flexible in the area of its two arms. In this way, the inserting process is advantageously enabled with particularly little energy or resistance.

According to a second aspect of the present invention, a method for removing a filter insert of a liquid filter is provided. In the mounted state, the liquid filter includes a housing, at least one liquid inlet, at least one liquid outlet and the filter insert. The filter insert includes a filter element extending along a longitudinal axis, a first end cap and a second end cap. The filter element is situated between the first end cap and the second end cap, as viewed along the longitudinal axis. The first end cap has a first channel-like opening, and the second end cap has a second channel-like opening. The method includes the following steps:

a first step: providing a removal tool according to the above description;

a second step: setting the removal tool into an open state, the two arms of the removal tool being elastically reversibly movable toward one another in the open state;

a third step: inserting the removal tool into the filter insert along an inserting direction in such a way that the distal end of the removal tool is fed completely through at least the first opening, which may be fed completely through the second opening and through the first opening;

a fourth step: setting the removal tool into a removal state by displacing the retaining element so that the retaining element is situated between the first arm and the second arm and a movement of the two arms toward one another is blocked during an application of a force onto one of the arms toward the other arm; and a fifth step: displacing the removal tool counter to the inserting direction so that the filter insert is removed from the housing together with the removal tool.

In the open state of the retaining element, the retaining element may, e.g., not be coupled to the second arm.

The provided method enables a removal of the filter insert from the housing of the liquid filter particularly easily and reliably. The reason is that the removal tool may be configured to be particularly flexible and inserted into the filter insert. At the same time, as a result of the displacement or switch-over of the retaining element, the removal tool is mechanically stiffened or stabilized in the extraction state, so that a slipping of the removal tool from an edge of the first opening of the first end cap of the filter insert is suppressed. In this way, the filter insert may be removed reliably and easily and without damage from the housing of the liquid filter.

Further features and advantages of the present invention will become apparent to those skilled in the art from the following description of exemplary specific embodiments, which, however, should not be interpreted as limiting the present invention, with reference to the accompanying drawings.

DETAILED DESCRIPTION

Figure 1A:
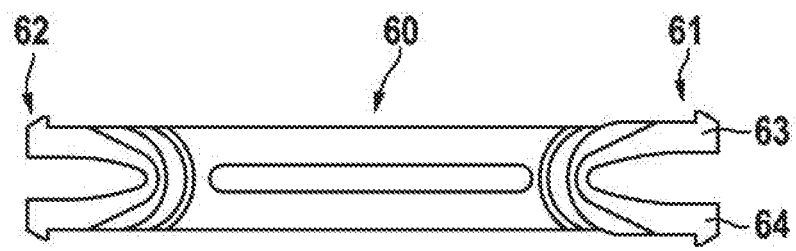
FIG. 1a through 1e show various representations of a removal tool and its use from the related art.

FIG. 1a shows a removal tool 60 from the related art. Removal tool 60 is configured in one piece in the form of an ice cream bar stick or a spatula. In other words: removal tool 60 has a flat, elongated extension. On a front distal end 61, removal tool 60 includes a first hook 63 and a second hook 64, which are configured in the form of two fork arms. A similar structure is also situated on the second distal end 62 of removal tool 60. Removal tool 60, in its center section, has a recess between first end 61 and second end 62, so that it may be shape-elastic and bendable.

Figure 1B:
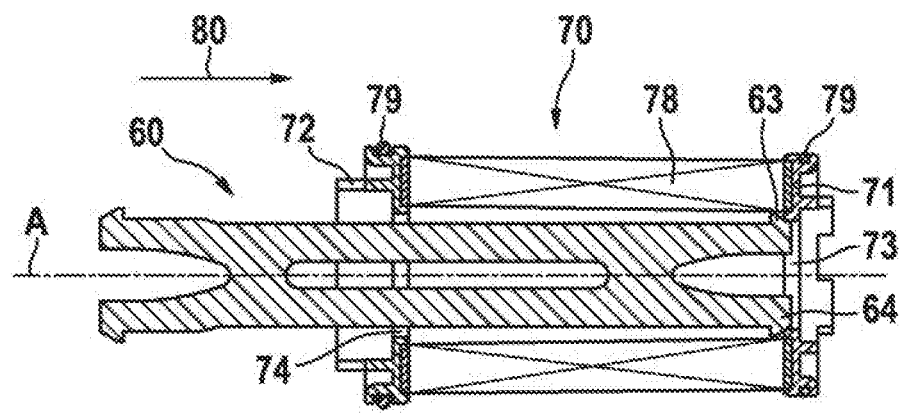

FIG. 1b shows removal tool 60 from the related art during the insertion along an inserting direction 80 into a filter insert 70. Filter insert 70 has a hollow-cylindrical shape and extends along a longitudinal axis A. Longitudinal axis A defines an axial direction. A radial direction or transverse direction Q (see FIGS. 2a through 2c), which extends perpendicularly to longitudinal axis A, is to be distinguished therefrom. Filter insert 70 includes a first end cap 71 having a first opening 73 and a second end cap 72 having a second opening 74. A filter element 78 is attached in a fluid-tight manner between the two end caps 71, 72. Filter element 78 also has a hollow-cylindrical shape, so that removal tool 60 may initially be pushed along longitudinal axis A in insertion direction 80 through second opening 74, then pass the hollow interior of filter element 78, and finally be pushed through first opening 73 of first end cap 71. The distance between the two hooks 63, 64 of the removal tool is greater than the diameters of first opening 73 and of second opening 74. Due to the fork-shaped configuration of first end 61 of removal tool 60, hooks 63, 64, may be elastically reversible inwardly deflected, in the manner of snap-fit hooks when striking on the edge of the respective opening 73, 74, and, after passing the respective opening 73, 74, may spring back outwardly.

Figure 1C:
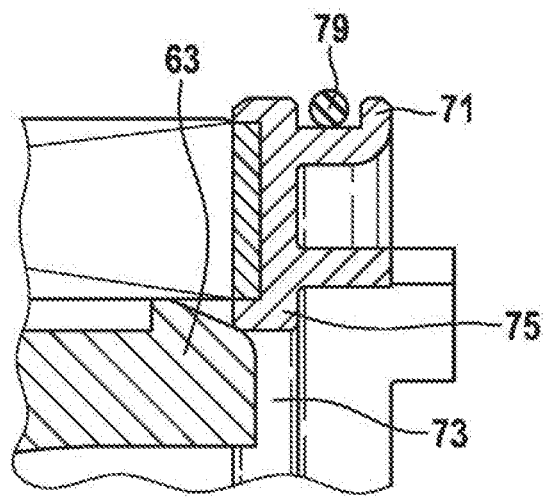

FIG. 1c shows an enlarged section from FIG. 1b in a state in which first hook 63 rests directly against edge 75 of first opening 73, shortly before passing first opening 73 during the inserting process.

Filter insert 70 moreover also includes sealing arrangement/apparatus 79, for example in the form of O-rings 79, which are each situated on a radial outer side of first end cap 71 and of second end cap 72, and enable sealing with respect to a housing 93 of a liquid filter 90.

Figure 1D:
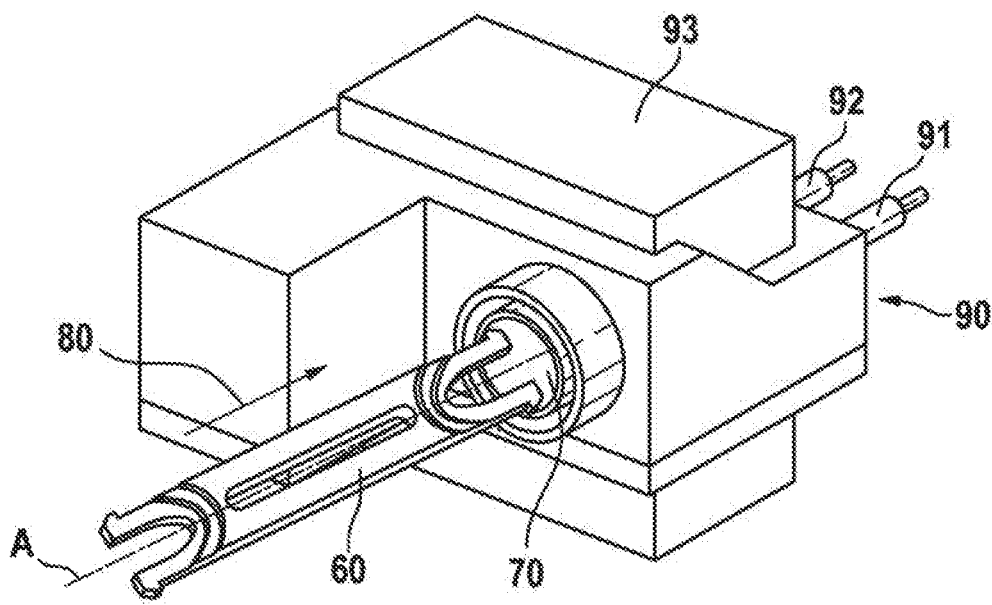

FIG. 1d shows a liquid filter 90 including a housing 93 and a liquid inlet 91 and a liquid outlet 92. Filter insert 70 is mounted in housing 93. Usually, filter insert 70 is covered by a cover in a fluid-tight manner. In the illustrated figure, however, filter insert 70 is to be removed from housing 93 with the aid of removal tool 60 from the related art. The state in which removal tool 60 is about to be inserted into filter insert 70 along inserting direction 80 is shown.

Figure 1E:
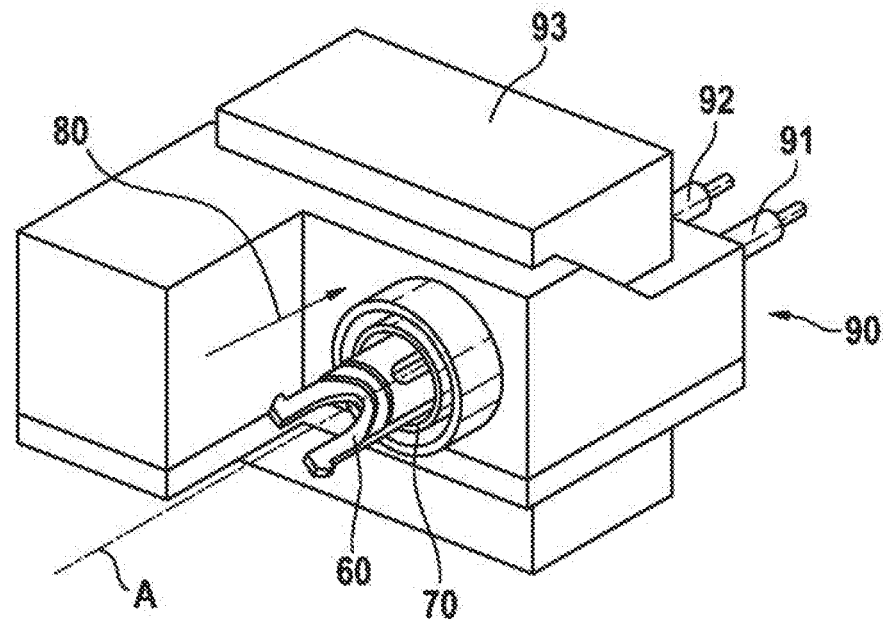

FIG. 1e shows liquid filter 90 from FIG. 1d, removal tool 60 now being inserted into filter insert 70 in such a way that the two hooks (not shown) engage behind edge 75 of first opening 73 (not shown) of filter insert 70. By a displacement of removal tool 60 counter to inserting direction 80, removal tool 60, together with filter insert 70, may now be removed from liquid filter 90.

Liquid filter 90 may, for example, be a fuel filter, e.g., for oil, diesel or gasoline. It is also possible for liquid filter 90 to be provided as a filter for filtering urea solution in a DENOX system or SCR (selective catalytic reduction) system. Other uses of the liquid filter 90 are also conceivable.

Figure 2A:
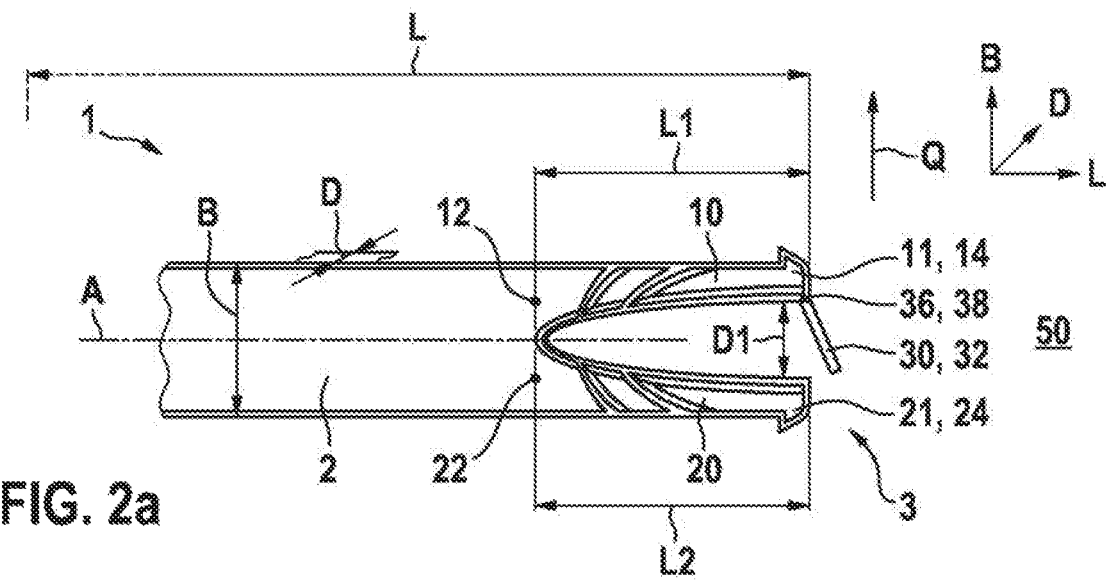
FIGS. 2a through 2c show schematic representations of a removal tool according to the present invention and its use in the insertion state and in the removal state.
Figure 2B:
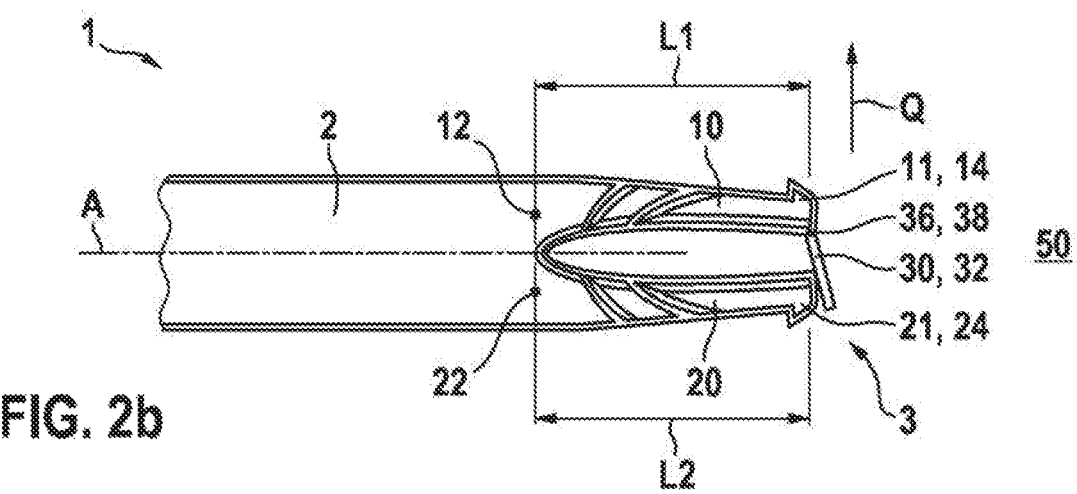
Figure 2C:
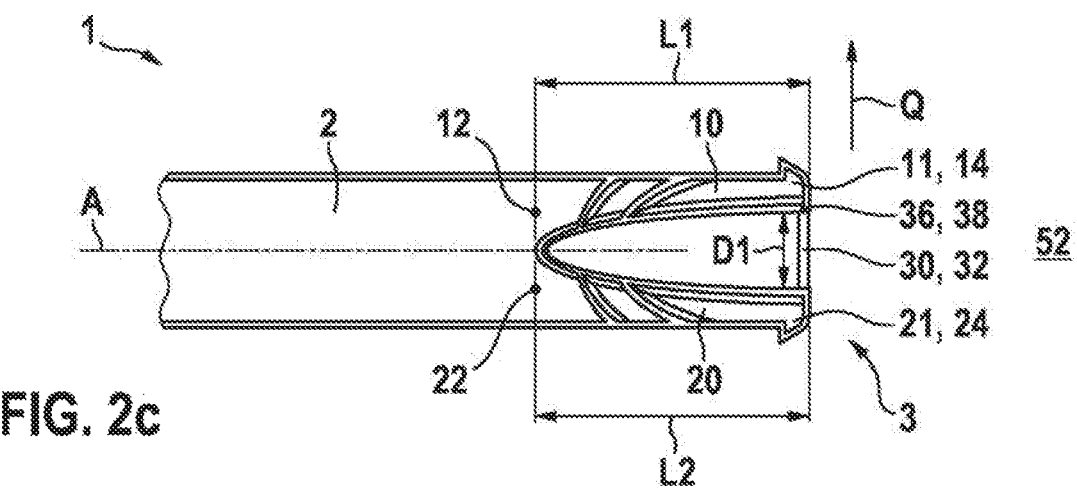

FIGS. 2a, 2b and 2c show a section of a removal tool 1 according to the present invention for a filter insert 70 of a liquid filter 90.

Removal tool 1 includes a body extending along a longitudinal axis A. At a distal end 3, body 2 includes a first arm 10 and a second arm 20. The two arms 10, 20 extend essentially in parallel to longitudinal axis A and are spaced apart from one another, in the form of two fork tines. The spacing has a maximum distance D1 along a transverse direction Q or transverse axis Q perpendicular to longitudinal axis A. A retaining element 30, 32 is situated on first arm 10.

In principle, the removal tool may be configured on the second distal end, which is not shown in the figures on the left side, similar to distal end 3.

FIGS. 2a and 2b show retaining element 30, 32 in an open state 50 or in an open position 50; FIG. 2c shows it in a closed state 52 or in a closed position 52.

Removal tool 1 from FIG. 2a is apparent in FIGS. 2b and 2c, the two arms 10, 20 in FIG. 2b being elastically reversibly deflected toward one another. In FIGS. 2a and 2b, retaining element 30, 32 projects obliquely forward from first arm 10 in open state 50. Between its extension direction and transverse axis Q or transverse direction Q, it may, e.g., enclose an angle of maximum 45° by its root, in the shown example approximately 30°. Retaining element 30 may be configured in the form of a bracket 32 or a catch 32 or a safety catch 32. Retaining element 30, 32 may be situated or attached on first arm 10 with the aid of a swivel joint 36 (on its root). For example, swivel joint 36 may be configured in the form of an integral joint 28, an integral hinge, a hinge or a snap hinge.

In FIG. 2c, retaining element 30, 32 has been displaced or transferred from open state 50 into closed state 52. For this purpose, retaining element 30, 32 has been pivoted or rotated about swivel joint 36, 38 toward the rear, i.e., in the direction of body 2. In closed state 52, retaining element 30, 32 is now situated between the two arms 10, 20 and couples the two arms 10, 20 to one another. This coupling is configured in such a way that a movement of the two arms 10, 20 toward one another is blocked during an application of a force onto one or both arm(s) 10, 20 along transverse direction Q toward the respective other arm 20, 10. Initially, a small gap may still be formed between retaining element 30, 32 and the second arm, which, however, is closed by the application of the force. As soon as retaining element 30, 32 makes mechanical contact with second arm 20, the further movement of first arm 10 relative to second arm 20 in transverse direction Q is blocked. Retaining element 30, 32 acts as a kind of safety catch in the process and stabilizes removal tool 1 in transverse direction Q.

Retaining element 30, 32 may be configured in such a way that, in the closed state, it prevents the reduction in a maximum distance D1 between the two arms 10, 20 in a force-free state by more than 10% of this maximum distance D1. In other words: in closed state 52 of retaining element 30, 32, a reduction in the maximum distance between arms 10, 20 to less than 90% of maximum distance D1 in the force-free state is prevented. A reduction to less than 95% of maximum distance D1 in the force-free state may be prevented, and most particularly may be a reduction to less than 98% of maximum distance D1 in the force-free state is prevented.

Removal tool 1 includes a first hook 11 on first arm 10 and a second hook 21 on second arm 20. First hook 11 and second hook 21 project from first arm 10 or from second arm 20 essentially transversely to longitudinal axis A. The two hooks 11, 21 point in opposite directions in the exemplary embodiment.

Removal tool 1 may have a flat configuration, i.e., an overall length L of body 2 is at least 5 times a width B of body 2, width B extending in transverse direction Q, and overall length L extending along longitudinal axis A. Furthermore, width B of body 2 is at least 3 times, which may be at least 5 times, a thickness D of body 2. Thickness D extends in a direction which extends perpendicularly to longitudinal axis A and perpendicularly to transverse axis Q. The directions of overall length L, of width B and of thickness D are indicated in the small coordinate system which is illustrated in FIG. 2a. FIGS. 2a through 2c only show one side of removal tool 1 with a distal end 3. Overall length L extends from the one distal end 3 to the other distal end (not shown here), retaining element 30, 32 not being included in overall length L.

A first length L1 of first arm 10 may, e.g., be at least 2.5 times or at least 3 times or even at least 3.5 times maximum distance D1 (in the force-free state) between the two arms 10, 20, e.g., 2.5 times or 3 times maximum distance D1. In the same way, a second length L2 of second arm 20 may, e.g., be at least 2.5 times or at least 3 times or even at least 3.5 times maximum distance D1 between the two arms 10, 20, e.g., 2.5 times or 3 times maximum distance D1. As a result of the provision of retaining element 30, 32, first and second lengths L1, L2 may be selected to be larger in comparison to maximum distance D1 of arms 10, 20 than in conventional removal tools. In this way, an improved shape elasticity is achieved, i.e., the removal tool may be pushed with less energy expenditure through narrow openings since arms 10, 20 may be elastically reversibly deflected further and more easily. By closing retaining element 30, 32, however, removal tool 1 is then at least as shape-stable, torsion-resistant, and slip-proof as conventional removal tools 1.

First length L1 is measured from a first root 12 of first arm 10 on body 2 up to a first free end 14 of first arm 10. In the same way, second length L2 of second arm 20 is measured from a second root 22 of second arm 20 on body 2 up to a second free end 24 of second arm 20. Root 12, 22 may, e.g., be considered to be the respective point or section of body 2 on which first arm 10 is no longer spaced apart from second arm 20.

FIGS. 3a through 3e show a removal process of a filter insert 70 in housing 93 of a liquid filter 90 with the aid of removal tool 1. Liquid filter 90 is shown in a cross section.

Liquid filter 90 includes housing 93 and filter insert 70. Filter insert 70 is configured similarly to filter insert 70 from FIG. 1b.

Figure 3A:
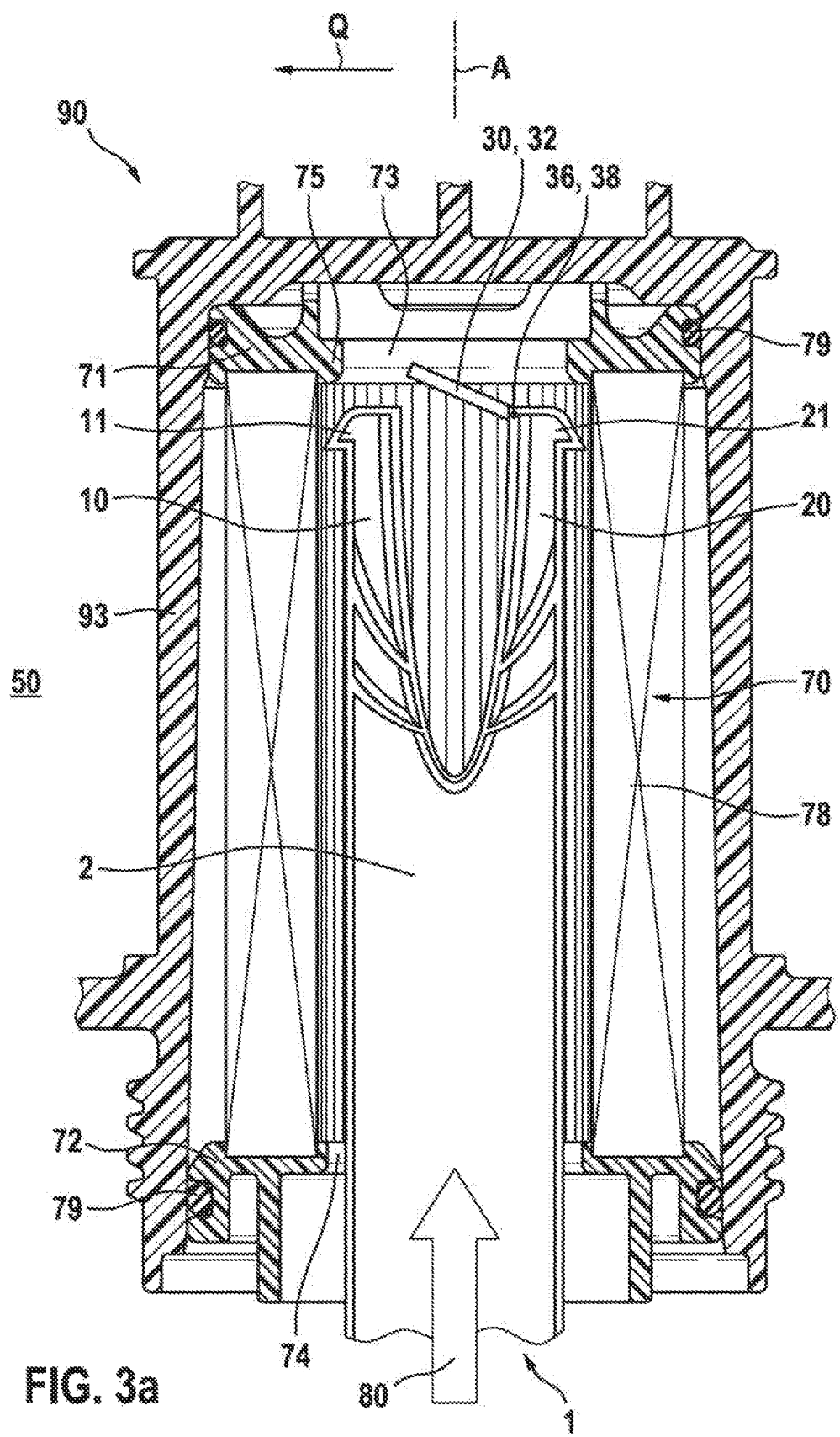
FIGS. 3a through 3c show schematic cross sections through a liquid filter during the removal process with the removal tool in the open state.
Figure 3B:
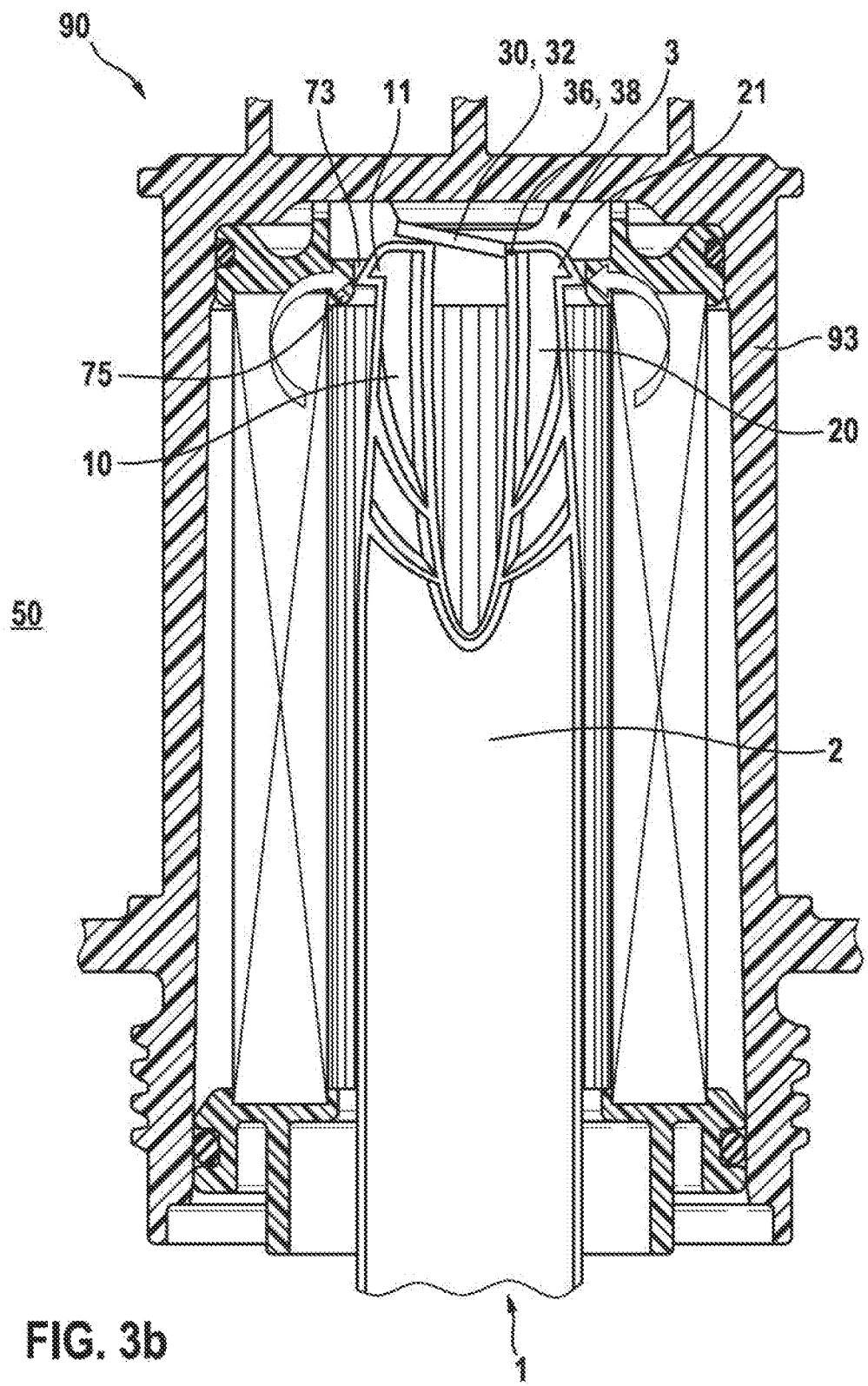
Figure 3C:
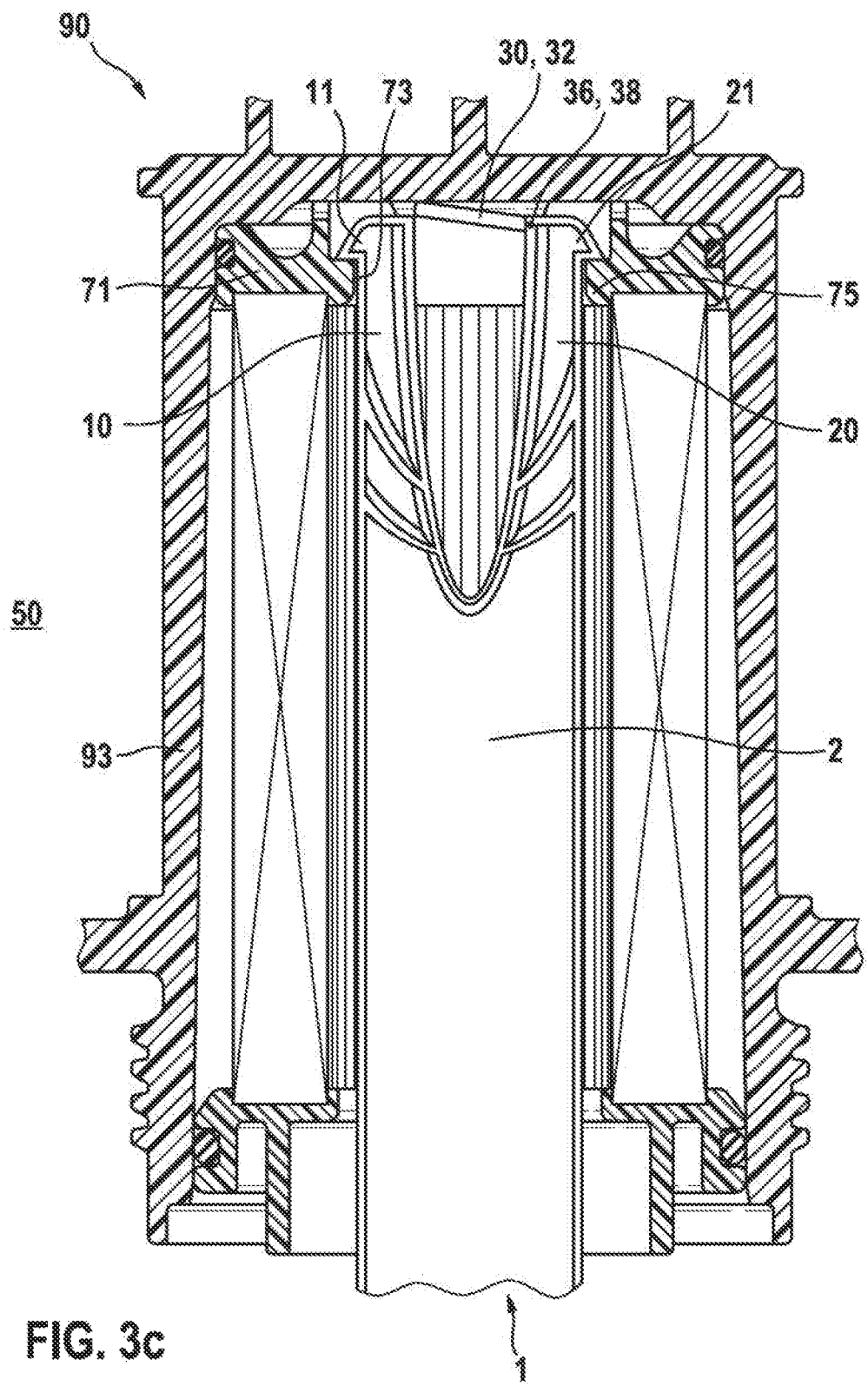

In FIGS. 3a through 3c, the insertion of removal tool 1 along an inserting direction 80 is shown. Inserting direction 80 extends essentially in parallel to longitudinal axis A.

In FIGS. 3a through 3c, retaining element 30 is configured in the form of a bracket 32 or a catch or a safety catch 32 and is in open state 50. Retaining element 30 thus projects forwardly from removal tool 1.

In FIG. 3a, removal tool 1 is pushed with its two hooks 11, 21 through second opening 74 of second end cap 72 and is situated inside filter insert 70.

In FIG. 3b, it is shown how removal tool 1, in an open state 50 of retaining element 30, 32, is pushed through first opening 73 of first end cap 71 of filter insert 70. The outer sides of the two hooks 11, 21 strike against edge 75 of first opening 73 in the process. Since the distance of the two hooks 11, 21 from one another is greater than the diameter of first opening 73, distal end 3 of removal tool 1 is flexibly displaced to the inside with its two arms 10, 20 by edge 75 of first opening 73. In other words: the two arms 10, 20 are elastically reversibly moved toward one another so that they are able to pass first opening 73. The elastically reversible movement to the inside is indicated by the two arrows on first arm 10 and on second arm 20. Retaining element 30 remains in open position 50 or in open state 50. In this way, first arm 10 may be moved toward second arm 20.

In FIG. 3c, distal end 3 with its two hooks 11, 21 has passed first opening 73. The two arms 10, 20 spring back away from one another again, i.e., outwardly, and latchingly engage behind edge 75. Retaining element 30, 32 is still in open state 50.

Figure 3D:
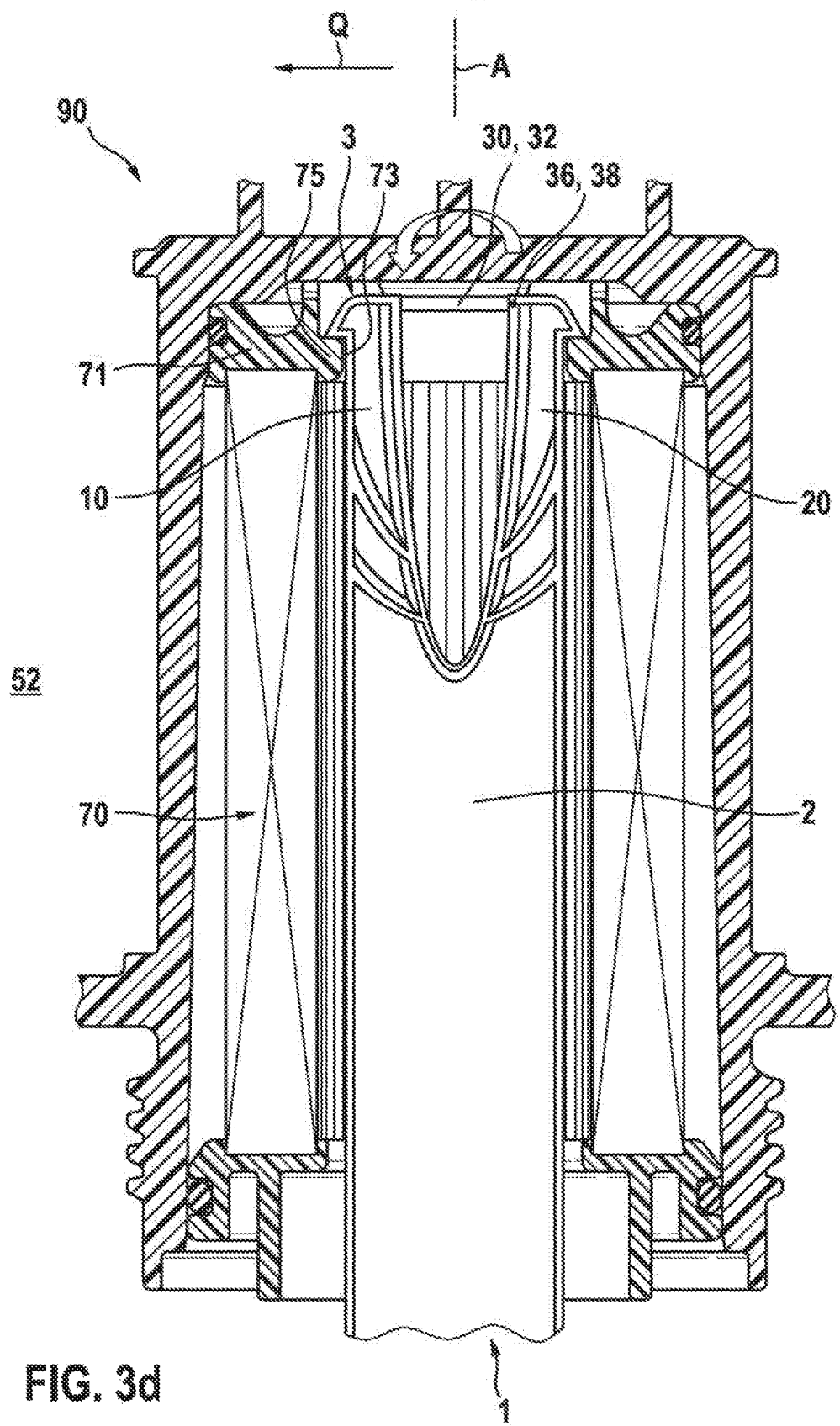
FIGS. 3d and 3e show schematic cross sections through a liquid filter during the removal process with the removal tool in the closed state.

In FIG. 3d, it is shown how retaining element 30, 32 was displaced into closed state 52—in this regard, see the movement direction of the closing process, which is indicated by the arrow over retaining element 30, 32. This may take place, for example, in that removal tool 1 in FIG. 3c is displaced or pushed slightly further along inserting direction 80, whereby retaining element 30, 32 strikes against an opposing wall, and the retaining element in this way is displaced into closed state 52. For example, retaining element 30, 32 may be rotated or pivoted about a swivel joint 36, it being possible, for example, for swivel joint 36 to be configured in the form of an integral joint 38, an integral hinge, a snap hinge or a hinge.

Closed state 52 shown in FIG. 3d or closed position 52 causes a stabilization of distal end 3 of removal tool 1. As a result of retaining element 30, 32 now situated between first arm 10 and second arm 20, first arm 10 is mechanically coupled to second arm 20. As a result, a movement of first arm 10 toward second arm 20 along transverse direction Q is blocked. In this way, an inadvertent slipping or a distortion of removal tool 1 from edge 75 of first opening 73 of first end cap 71 of filter insert 70 is prevented.

Figure 3E:
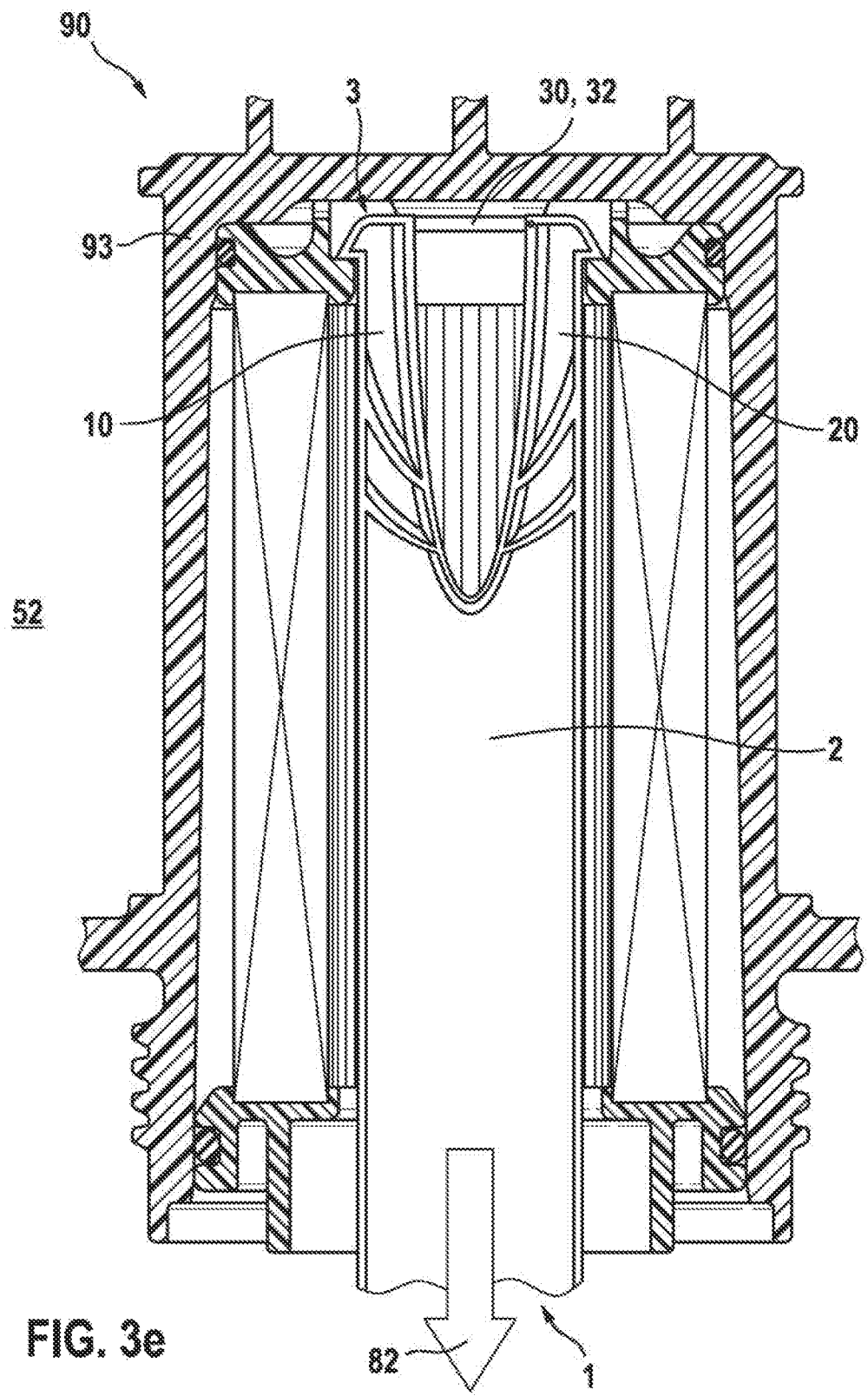

FIG. 3e shows how filter insert 70 may be moved out of housing 93 of liquid filter 90 by pulling on removal tool 1 in a removal direction 82, which is opposite inserting direction 80. As a result of the stiffening of distal end 3 of removal tool 1 as a consequence of retaining element 30, 32 situated or present between first arm 10 and second arm 20 in closed state 52, in this way a secure and reliable removal of filter insert 70 is possible. The slipping of removal tool 1 from edge 75 is thus suppressed.

Figure 4:
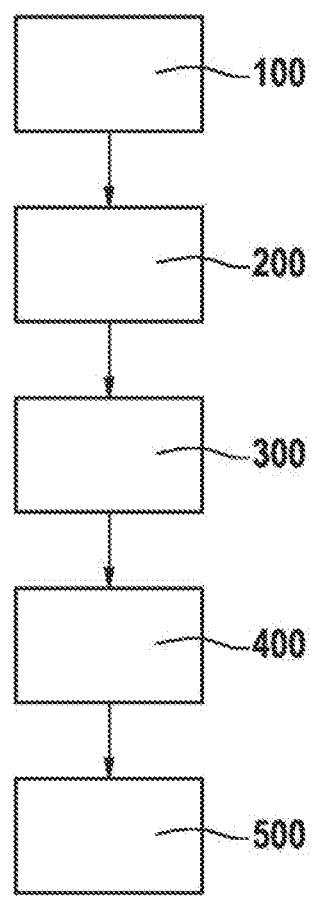
FIG. 4 shows steps of a method for removing a filter insert of a liquid filter.

FIG. 4 shows a method for removing a filter insert 70 of a liquid filter 90. As is shown, e.g., in FIGS. 3a through 3e, liquid filter 90 in the mounted state includes a housing 93, at least one liquid inlet 91, at least one liquid outlet 92, and filter insert 70. Filter insert 70 includes, e.g., a filter element 78 extending along a longitudinal axis A, a first end cap 71, and a second end cap 72, filter element 78 being situated between first end cap 71 and second end cap 72, as viewed along longitudinal axis A, first end cap 71 including a first channel-like opening 73, second end cap 72 including a second channel-like opening 74. The method includes the following steps:
  a first step 100: providing a removal tool 1;
  a second step 200: setting the removal tool into an open state 50 or into an open position 50, the two arms 10, 20 of removal tool 1 being elastically reversibly movable toward one another in open state 50;
  a third step 300: inserting removal tool 1 into filter insert 70 along an inserting direction 80 in such a way that distal end 3 of removal tool 1 is at least fed through first opening 72, which may be fed completely through second opening 74 and through first opening 72;
  a fourth step 400: setting removal tool 1 into a removal state 52 by displacing retaining element 30, 32 so that the retaining element is situated between first arm 10 and second arm 20 and a movement of the two arms 10, 20 toward one another is blocked during an application of a force onto one of arms 10, 20 toward the other arm 20, 10; and
  a fifth step 500: displacing removal tool 1 counter to inserting direction 80 so that filter insert 70 is removed from housing 93 together with removal tool 1.

Shown removal tools 1 may be manufactured in a plastic injection molding process, for example. They may be manufactured from polypropylene, polyamide or polyethylene or at least partially include these materials.

The provided removal tool 1 is suitable for removing filter inserts 70 of liquid filters 90, for example for fuel filters or urea filters. Due to its properties, it is universally usable, i.e., for different types of filter inserts 70, easily manufacturable, cost-effective, and allows the reliable removal of filter inserts 70 from a housing 93 of an associated liquid filter 90.

What is claimed is:

1. A removal tool for a filter insert of a liquid filter, comprising:
  a first arm;
  a second arm; and
  a body extending along a longitudinal axis, at a distal end, wherein the body includes the first arm and the second arm;
  wherein the two arms extend essentially in parallel to the longitudinal axis and are spaced apart from one another, and wherein the two arms are elastically reversibly deflectable toward one another, and
  wherein a retaining element is situated on the first arm and attached thereto, wherein, in an open state of the retaining element, the two arms are movable toward one another, and wherein in a closed state of the retaining element, the retaining element couples the two arms to one another and blocks a movement of the two arms toward one another,
  wherein in the open state, the retaining element is attached to the first arm but is not attached to the second arm.

2. The removal tool of claim 1, wherein the first arm includes a first hook, the first hook projecting from the first arm essentially transversely to the longitudinal axis, and wherein the second arm includes a second hook, the second hook projecting from the second arm essentially transversely to the longitudinal axis, and wherein the two hooks point in opposite directions.

3. The removal tool of claim 1, wherein the body has a flat configuration, wherein an overall length of the body is at least 5 times a width of the body, and wherein the width of the body is at least 3 times a thickness of the body.

4. The removal tool of claim 1, wherein the retaining element is configured as one of a bracket, a catch, or a safety catch.

5. The removal tool of claim 1, wherein the retaining element is situated at the first arm so that it projects forwardly from the body in the open state and encloses an angle of maximum 45° to a transverse direction, wherein at least one of the transverse direction extends perpendicularly to the longitudinal axis or the retaining element is situated on the first arm so that it extends in the transverse direction between the two arms in the closed state.

6. The removal tool of claim 1, wherein the retaining element, in the closed state, together with the second arm forms a detachable connection, and wherein the connection is one of form-locked, force-fit, or frictionally engaged.

7. The removal tool of claim 1, wherein at least one of a first length of the first arm from its first root at the body up to its first free end is at least 2.5 times a maximum distance between the two arms, or a second length of the second arm from its second root on the body up to its second free end is at least 3 times a maximum distance between the two arms.

8. The removal tool of claim 1, wherein at least one of a first length of the first arm from its first root at the body up to its first free end is at least 3 times a maximum distance between the two arms, or a second length of the second arm from its second root on the body up to its second free end is at least 3 times a maximum distance between the two arms.

9. A removal tool for a filter insert of a liquid filter, comprising:
  a first arm;
  a second arm; and
  a body extending along a longitudinal axis, at a distal end, wherein the body includes the first arm and the second arm;
  wherein the two arms extend essentially in parallel to the longitudinal axis and are spaced apart from one another, and wherein the two arms are elastically reversibly deflectable toward one another, and
  wherein a retaining element is situated on the first arm, wherein, in an open state of the retaining element, the two arms are movable toward one another, and wherein in a closed state of the retaining element, the retaining element couples the two arms to one another and blocks a movement of the two arms toward one another, wherein the retaining element is attached to the first arm with a swivel joint.

10. The removal tool of claim 9, wherein the swivel joint includes one of an integral joint, a hinge, or a snap hinge.

11. A method for removing a filter insert of a liquid filter, the method comprising:
providing a removal tool, wherein the removal tool includes a first arm, a second arm, and a body extending along a longitudinal axis, at a distal end, wherein the body includes the first arm and the second arm, wherein the two arms extend essentially in parallel to the longitudinal axis and are spaced apart from one another, and wherein the two arms are elastically reversibly deflectable toward one another, and wherein a retaining element is situated on the first arm, wherein, in an open state of the retaining element, the two arms are movable toward one another, and wherein in a closed state of the retaining element, the retaining element couples the two arms to one another and blocks a movement of the two arms toward one another, and wherein the liquid filter, in a mounted state, includes a housing, at least one liquid inlet, at least one liquid outlet and the filter insert, the filter insert including a filter element extending along a longitudinal axis, a first end cap and a second end cap, the filter element being situated between the first end cap and the second end cap, as viewed along the longitudinal axis, the first end cap including a first channel-like opening, the second end cap including a second channel-like opening;
setting the removal tool into an open state, the two arms of the removal tool being elastically reversibly movable toward one another in the open state;
inserting the removal tool into the filter insert along an inserting direction so that the distal end of the removal tool is fed completely through the second opening and through the first opening;
setting the removal tool into a removal state by displacing the retaining element so that the retaining element is situated between the first arm and the second arm and a movement of the two arms toward one another is blocked during an application of a force onto one of the arms toward the other arm; and
displacing the removal tool counter to the inserting direction so that the filter insert is removed from the housing together with the removal tool.

* * * * *